United States Patent [19]
Poliker et al.

[11] 4,223,908
[45] Sep. 23, 1980

[54] STEERING SYSTEM FOR VEHICLE TRAINS

[76] Inventors: Boris E. Poliker, ulitsa Velozavodskaya, 6, kv. 5, Moscow; Georgy M. Georgievsky, Chekhovsky raion, poselok Novy byt, 4, kv. 22; Anatoly A. Kotov, Chekhovsky raion, poselok Novy byt, 29, kv. 65, both of Moskovskaya oblast; Sergei P. Kozyrev, ulitsa Verkhnaya, 18, kv. 32, Moscow; Nikolai N. Markelov, ulitsa Krasnoarmeiskaya, 30, kv. 17, Moscow; Nikolai F. Chukhchin, ulitsa Verkhnaya, 18 kv. 44, Moscow; Eduard A. Kalinin, Ruzheiny pereulok, 4, kv. 200, Moscow; Sergei S. Dmitrichenko, ulitsa Verkhnaya, 18, kv. 58, Moscow; Alexandr P. Ishanov, ulitsa Planernaya, 12, korpus 1, kv. 445, Moscow; Boris P. Kashuba, ulitsa Girshmana, 17"B", kv. 3; Adolf D. Levitanus, ulitsa Garshina, 5/7, kv. 2, both of Kharkov, all of U.S.S.R.

[21] Appl. No.: 940,997

[22] Filed: Sep. 11, 1978

[30] Foreign Application Priority Data

Sep. 21, 1977 [SU] U.S.S.R. ............................ 2524093[I]

[51] Int. Cl.² ............................................. B60D 13/00
[52] U.S. Cl. .................................. 280/419; 180/14 R; 280/468
[58] Field of Search ............... 280/419, 408, 409, 410, 280/444, 445, 468, 469, 470, 471; 180/14 R, 14 A

[56] References Cited

U.S. PATENT DOCUMENTS

| 1,541,665 | 6/1925 | Sewell | 180/14 R |
| 3,035,537 | 5/1962 | Smith | 280/468 X |

FOREIGN PATENT DOCUMENTS 734241  7/1932  France .......................... 280/DIG. 9

Primary Examiner—John A. Pekar
Attorney, Agent, or Firm—Steinberg and Blake

[57] ABSTRACT

A train comprising a lead and a plurality of interconnected succeeding transport vehicles and having devices for actuating the steering gears of succeeding vehicles. Adjacent transport vehicles are interconnected through links, whereas each device for actuating the steering gear incorporates two shafts vertically mounted on the bodies of adjacent transport vehicles and connected to pulleys wound around with a flexible pulling member, and a bushing hingedly installed on each vertical shaft and rigidly associated with said link. The vertical shaft mounted on the preceding transport vehicle is kinematically associated with an independent drive remotely controlled from the lead transport vehicle, while the succeeding transport vehicle and the shaft of the steering gear thereof carry pulleys wound around in a crosswise manner with flexible pulling member.

2 Claims, 6 Drawing Figures

STEERING SYSTEM FOR VEHICLE TRAINS

The present invention relates to road transport and more particularly to trains comprising a lead and a plurality of succeeding transport vehicles.

It is most advantageous to make up the train, according to the invention, of a plurality of wheel tractors for diverse agricultural operations (plowing, sowing, cultivation, etc.).

The proposed train may be composed of any wheeled transport vehicles provided with a hydraulic or any other drive of the steering gear.

The proposed train may also comprise a plurality of automobiles or an automobile and a plurality of trailers provided with steering gears.

Known in the art is a train composed of interconnected motorized transport vehicles, wherein each succeeding transport vehicle is associated with a preceding transport vehicle through a bracket having a hole and attached to the fork of the steerable wheel of one transport vehicle, an eyelet fixed on the body of the other transport vehicle, and a fastener running though the eyelet and the hole in the bracket.

The above-mentioned train is provided with devices for actuating the controls of the transport vehicles, i.e., brake and accelerator pedals used for controlling deceleration and acceleration of the train.

The prior art train is intended to be used as interplant transport. All the succeeding transport vehicles in that train follow the track of the lead vehicle only if the train moves rectilinearly. As the train turns, the track of the succeeding transport vehicles is displaced relative to the track of the lead transport vehicle, which increases the turning radius and, consequently, reduces manoeuvrability of the train.

It is an object of the present invention to provide such a train in which steering gears of succeeding transport vehicles would be acted upon so as to increase manoeuvrability of the train both when moving rectilinearly and when making turns.

Another object of the present invention is to provide for a succeeding transport vehicle automatic tracking of the path of a preceding transport vehicle.

To the accomplishment of the foregoing and other ends there is proposed a train comprising a lead and a plurality of interconnected succeeding transport vehicles and having devices for actuating the steering gears of the succeeding transport vehicles, wherein, according to the invention, the adjacent transport vehicles are interconnected through links, whereas each device for actuating the steering gear incorporates two shafts vertically mounted on the bodies of adjacent transport vehicles and connected to pulleys wound around with a flexible pulling member, and a bushing hingedly installed on each vertical shaft and rigidly associated with said link, the vertical shaft installed on a preceding transport vehicle being kinematically associated with an independent drive remotely controlled from the lead transport vehicle, while the vertical shaft mounted on the succeeding transport vehicle and the shaft of the steering gear thereof carry pulleys wound around in a crosswise manner with a flexible pulling member.

It is advantageous that each pulley is rotatably mounted on the bushing connected with the link, and is associated with the appropriate vertical shaft through a hinge making possible angular displacement of the pulley relative to said shaft, while mounted on the latter is an additional bushing whose outer surface has affixed thereto two horizontally aligned axles carrying the bushing associated with the link.

The proposed connection of the pulley with the vertical shaft and the bushing enables said train to be used for traveling on broken terrain, which is particularly advantageous in agriculture.

The train of the present invention has a number of advantages as compared with the prior art train. The succeeding transport vehicles follow the path of travel of the lead transport vehicle to automatically return to the initial path in case of deviation therefrom, the transport vehicles being able to follow each other in succession or travel along parallel routes. The ability to travel along parallel routes is particularly important in agriculture, for it allows one driver to till a substantially larger surface of the field.

Movement of the proposed train on turns can be effected both along parallel routes and on one track. Movement along parallel routes is practicable in employing the circular method of land tillage or when traveling on soft soils.

The train of the present invention is capable of moving not only over smooth flat terrain but also on broken terrain with considerable angles of gradient, the transport vehicles traveling at different levels.

Given below is the description of an embodiment of the present invention with due reference to the accompanying drawings, wherein.

Figure 1:
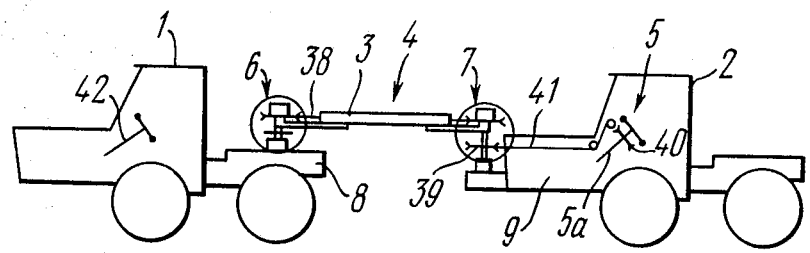
FIG. 1 illustrates a train comprising a lead and a succeeding transport vehicles, according to the invention.

The train is made up of two interconnected transport vehicles which, in the embodiment being disclosed, are tractors; a lead tractor 1 (FIGS. 1, 2) and a succeeding tractor 2. The train may be composed of a lead and a plurality of succeeding tractors.

The tractors 1 and 2 are interconnected through a link 3. Located between the tractor 1 and the tractor 2 is a device 4 for actuating a steering gear 5 of the tractor 2. The device 4 comprises two parts: a part 6 (FIG. 1) and a part 7. The part 6 is disposed on a body 8 of the lead tractor 1, on the side facing the tractor 2. The part 7 is arranged on a body 9 of the succeeding tractor 2, on the side facing the tractor 1. The part 6 of the device 4 comprises a vertical shaft 10 (FIG. 3) mounted on bearings 11 in a holder 12 attached on the body 8. The vertical shaft 10 is associated with a pulley 13 through a hinge 14 making possible angular displacement of the pulley 13 relative to the shaft 10. The pulley 13 is mounted on a bushing 16 through bearings 15, the bushing 16 being rigidly connected with the end of the link 3.

Figure 3:
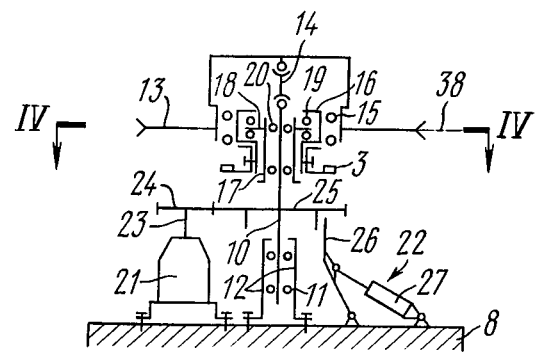
FIG. 3 represents a part of a device for actuating the steering gear, mounted on the lead transport vehicle.
Figure 4:
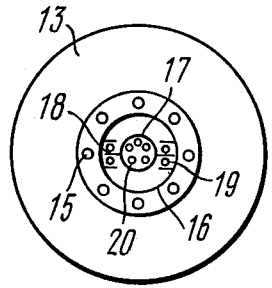
FIG. 4 is a section on the line IV—IV of FIG. 3.

The bushing 16 is installed on the vertical shaft 10 coaxially therewith. Mounted internally in said bushing and coaxially therewith is an additional bushing 17 whose outer surface carries two horizontally aligned axles 18 (FIGS. 3, 4). Said axles have the bushing 16 mounted thereon through bearings 19. Such an arrangement of the bushing 16 on the horizontally disposed axles 18 enables the link 3 to shift in a vertical plane together with the pulley 13 in the event of a bumpy condition of the surface over which the train is travelling. The bushing 17 is mounted on the vertical shaft 10 in bearings 20. For rotation of the shaft 10, the latter is provided with an independent drive composed of an electric motor 21 (FIG. 3) and a brake 22 and remotely controlled from the lead tractor 1. A shaft 23 of the electric motor is connected with the vertical shaft 10 through gears 24 and 25.

The brake 22 contains a braking element 26 associated with a rod of a pneumatic cylinder 27.

The part 7 (FIG. 1) of the device 4 comprises a vertical shaft 28 (FIG. 5) mounted on bearings 29 in a holder 30 attached to the body 9 of the succeeding tractor 2. The vertical shaft 28 is connected with a pulley 31 through a hinge 32 making possible angular displacement of the pulley 31 relative to the shaft 28. The pulley 31 through bearings 33 is mounted on a bushing 34 rigidly connected with the end of the link 3.

The bushing 34 is installed on the vertical shaft 28 coaxially therewith. Mounted internally within said bushing and coaxially therewith is an additional bushing 35 whose outer surface carries two horizontally aligned axles 36. Said axles have the bushing 34 mounted thereon through bearings 37. Such an arrangement of the bushing 34 on the horizontally disposed axles 36 enables the link 3 to shift in a vertical plane together with the pulley 31 in the event of a bumpy condition of the surface over which the train is traveling.

Figure 5:
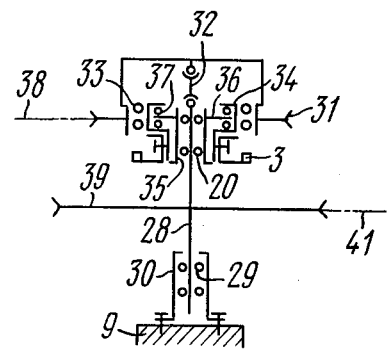
FIG. 5 represents a part of the device for actuating the steering gear, mounted on the succeeding transport vehicle.
Figure 6:
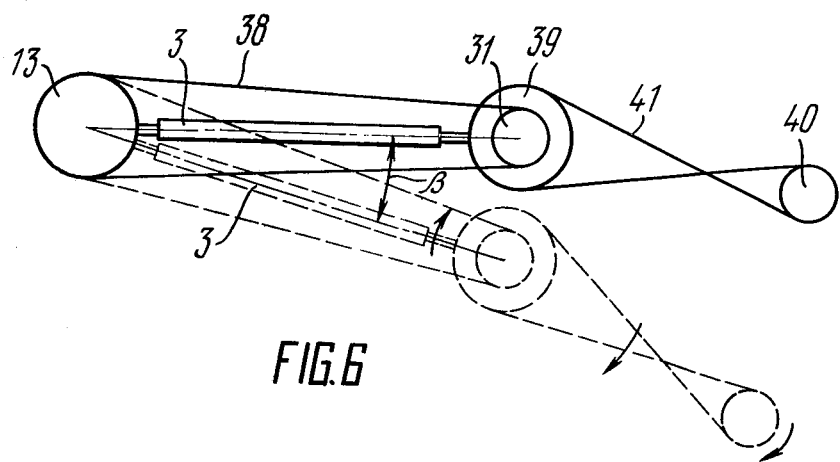
FIG. 6 is a plan view of pulleys with flexible pulling members wound therearound.

The bushing 35 is mounted on the vertical shaft 28 in the bearings 20 similar to those of the part 6. A flexible closed-circuit pulling member, a cable 38 (FIG. 6), imparts rotation from cable 38 on the pulleys 13 and 31, the former being wound around the pulleys in several rows (not shown). An additional pulley 39 is attached to the vertical shaft 28 mounted on the body 9 of the tractor 2, while a pulley 40 is fixed on the shaft 5a (FIG. 1) of the steering gear 5 of the tractor 2. Wound around the additional pulley 39 and the pulley 40 is a flexible pulling member—a cable 41 (FIG. 6)—which is disposed in a crosswise manner to change the sense of rotation of the shaft 5a (FIG. 1) of the steering gear 5 relative to the vertical shaft 28 (FIG. 5).

The tractors 1 and 2 (FIG. 1) are provided with systems to control braking, changing movement speeds within the range of one gear and gear shifting, which are not shown in the drawings because of their not being the subject of the present invention. To facilitate the use of the flexible pulling member—the cable 38, the link 3 is made in the form of a pipe for the cable 38 to pass therethrough.

When driving the train over hard flat surfaces, e.g. in carrying cargoes over interplant roads, airfields and the like, the pulleys may be rigidly fixed on the vertical shafts of the transport vehicles, while the bushing connected with the links may be installed on said vertical shafts through bearings.

The train of a lead and a plurality of succeeding transport vehicles operates in the following way.

Figure 2:
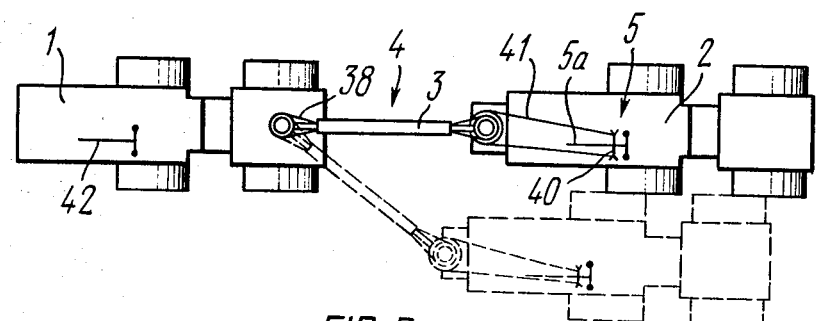
FIG. 2 is a plan view showing the same.

In the event of rectilinear motion the transport vehicles—in the given embodiment the tractors 1 and 2—can follow one another in succession or move along parallel routes, as shown in FIG. 2 by dash lines (the position of the succeeding tractor 2).

The lead tractor 1 is driven by a driver who steers it along the required path, actuating its steering gear 42 (FIG. 1).

In case of a straight motion the brake 22 brakes the vertical shaft 10, thereby immobilizing the pulley 13 relative to the body 8 of the tractor 1 (FIG. 3), the motor 21 being disconnected.

The tractors 1 and 2 follow a straight-line path in a pre-set order, either along the same track or over parallel routes. Should the succeeding tractor 2 be accidentally acted upon, it may deviate from the pre-set position and turn aside. As a result, the link 3 will deviate from the initial position together with the tractor 2 and will assume the position shown in FIG. 6 by dash lines. The pulley 13 being stationary relative to the body 8 of the tractor 1 and the cable 38 having no possibility of slipping on the pulley 13, the pulley 31 will turn by an angle $\beta$ (FIG. 6) corresponding to the value of the accidental deviation of the tractor 2 from the initial path. The turning of the pulley 31 through the hinge 32 will be imparted to the vertical shaft 8 movably installed in the holder 29 on the body 9 of the succeeding tractor 2. The turn of the vertical shaft 28 will result in a turn of the additional pulley 39 fixed thereon. The cable 41 being wound around the additional pulley 39 and the pulley 40 without the possibility of slipping, the pulley 40 will turn by an angle proportional to the value of deviation of the tractor 2 from the initial path. The shaft 5a of the steering gear 5, which ensures turning of the tractor 2, will turn together with the pulley 40. Owing to crosswise arrangement of the cable 41 the tractor 2 will turn in the direction opposite to that of deviation of the link 3. As the value of deviation of the tractor 2 from the initial position during turning decreases, the shaft 5a of the steering gear 5 will return to the initial position, which ensured movement of the tractor 2 along the initial path, thus effecting automatic tracking of the path of travel by the succeeding tractor 2, the path being pre-set by the driver.

Turning of the train composed of the tractors 1 and 2 may be done either along parallel routes or along the same path, depending on the driver's will. In turning the tractors 1 and 2 along parallel routes the driver actuates the steering gear 42 of the lead tractor 1 for turning thereof, the succeeding tractor 2 automatically tracking the path pre-set by the lead tractor 1 with the aid of the device 4 as hereinabove described.

For turning the tractors 1 and 2 along the same path, the driver disengages the brake 22, thus enabling the vertical shaft 10 and, consequently, the pulley 13 to rotate relative to the body 8 of the tractor 1. Thereafter the driver actuates the steering gear 42 of the lead tractor 1 to make the required turn. The pulley 13 being rotatable relative to the body 8 of the tractor 1 and the resistance to turning of the shaft 5a of the steering gear 5 of the succeeding tractor 2 being considerably superior to that of turning of the pulleys 13 and 31 and of the vertical shafts 10 and 28, the lead tractor 1 will continue to move rectilinearly. The distance herein covered by the lead tractor 1 for turning the tractors 1 and 2 along the same track will be equal to the length of the link 3. After said distance has been covered by the succeeding tractor 2 the driver on the lead tractor 1 engages the remotely controlled motor 21 of the independent drive which turns, as hereinabove described, the shaft 5a of the steering gear 5 of the succeeding tractor 2 through the vertical shaft 10 by an angle corresponding to one-track motion of the tractors 1 and 2. Following this the driver cuts out the motor 21 and engages the brake 22. The tractors 1 and 2 will turn following the same track.

To bring the tractors 1 and 2 from a turn onto a straight path, the driver performs the same operations and in the same sequence as in the case of making a turn, the only difference being that the steering gear 42 of the lead tractor 1 and the motor 21 must be rotated in the opposite sense. The hinges 14 and 32 connecting the corresponding vertical shafts 10 and 28 with the pulleys 13 and 31 allow rotation to be transmitted from vertical shaft 10 to the pulley 13 and from the pulley 31 to the vertical shaft 28, with the pulleys 13 and 31 inclined relative to the vertical shafts 10 and 28. The pulleys 13 and 31 assume the inclined position in the event of the tractors 1 and 2 traveling over broken terrain at different levels, in which case the pulleys 13 and 31 are in the same plane with the axles 18 and 36 serving as oscillation axes for the link 3, thereby ensuring serviceability of the train with the tractors 1 and 2 moving over broken terrain. Owing to the presence of the independent drive of the steering gear 5 of the succeeding tractor 2 the driver can arbitrarily set the succeeding tractor 2 and the lead tractor 1 either on the same track or on parallel routes, the succeeding tractor 2 being able to travel either to the left or to the right of the lead tractor. The maximum distance between the geometric longitudinal axes of the lead and the succeeding tractors 1 and 2 during their parallel-route motion is equal to the length of the link 3, the latter assuming the position perpendicular to said axes.

In choosing the length of the link somewhat superior to that of the tractor the driver can place the tractors in a row parallelly to each other, which substantially facilitates the drivers observation of the quality of the agricultural operation being performed.

An experimental model of such a train made up of serially produced tractors with a hydraulic steering gear has successfully passed the tests, which have confirmed vast possibilities of using such a train for labour-consuming agricultural operations (plowing, sowing, cultivation, etc.).

In describing the preferred embodiment of the present invention, specific terminology is resorted to for the sake of clarity. However, it is not intended to be limited to the specific terms so selected, and it is to be understood that each specific term includes all technical equivalents which operate in a similar manner to accomplish a similar purpose.

Though the invention has been described herein in connection with the preferred embodiment thereof, it is to be understood that variations and modifications may be made without departing from the spirit and the scope of the invention as those skilled in the art will readily understand.

Such alterations and modifications are to be considered as falling within the spirit and the scope of the invention and the appended claims.

What is claimed is:

1. In a train comprising a lead transport vehicle; and at least one succeeding transport vehicle, each having a respective steering gear, devices for actuating said steering gears of said succeeding transport vehicles, each of said devices located between a succeeding transport vehicle and a transport vehicle preceding the same, and each device comprising: a first vertical shaft selectively rotatably mounted on the body of said preceding transport vehicle, a second vertical shaft rotatably mounted on the body of said succeeding transport vehicle, a first pulley mounted for rotation with said first vertical shaft, a second pulley mounted for rotation with said second vertical shaft, a flexible pulling member wound around said pulleys, a pair of bushings, each being located on one of said first and second vertical shafts, a link with one end thereof secured to said bushing of said first vertical shaft and the other end secured to said bushing of said second vertical shaft, drive means kinematically associated with said first shaft for selectively reversibly rotating the same and remotely controlled from said lead transport vehicle, an additonal pulley secured on said second vertical shaft, a pulley secured on the shaft of said steering gear of said succeeding transport vehicle, a flexible pulling member wound in a crosswise manner around said additional pulley and a pulley mounted on the shaft of said steering gear of said succeeding transport vehicle.

2. In the combination according to claim 1, wherein each of said first and second pulleys is rotatably mounted on the bushing connected with the link and additionally is hingedly connected to the respective one of said first and second vertical shafts by a respective hinge in a manner such that each respective pulley is angularly displaceable with respect to its respective shaft, and an additional bushing mounted on each respective shaft whose outer surface has affixed thereto two horizontally aligned axles carrying the bushing associated the link whereby said link can shift in a vertical plane together with each of said respective pulleys.

* * * * *